United States Patent Office 2,850,432
Patented Sept. 2, 1958

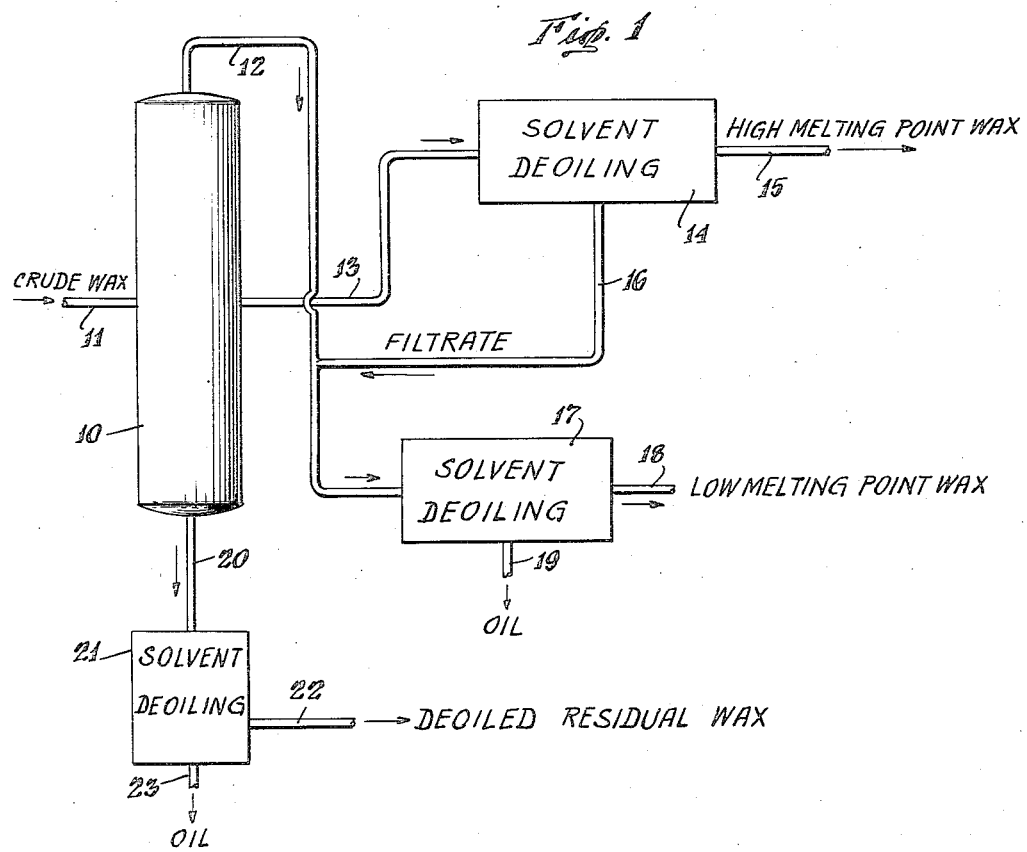
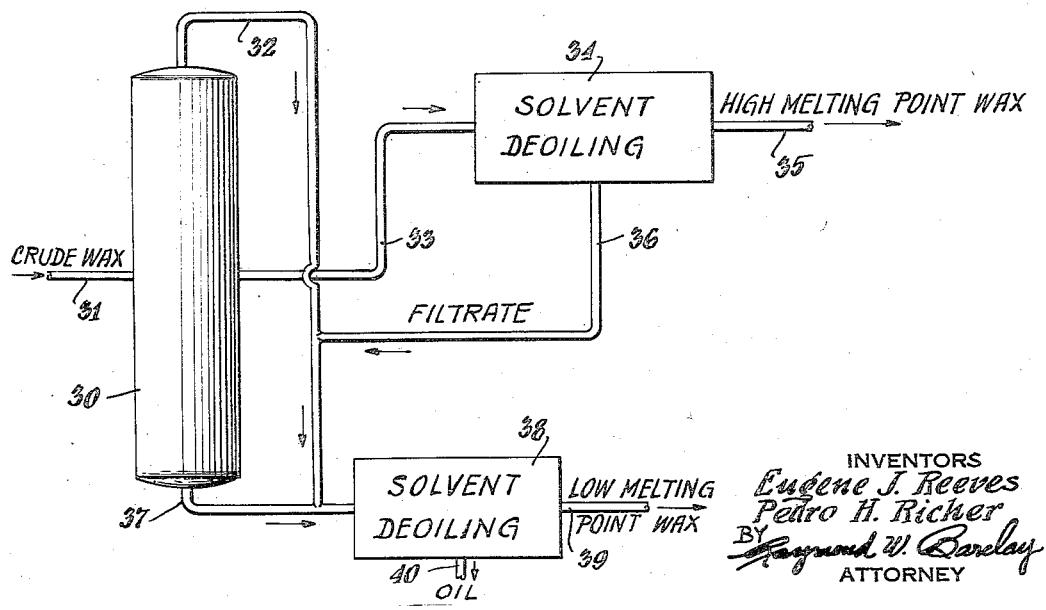

2,850,432

TREATMENT OF CRUDE WAX

Pedro H. Richer and Eugene J. Reeves, Beaumont, Tex., assignors to Socony Mobil Oil Company, Inc., New York, N. Y., a corporation of New York Application December 29, 1955, Serial No. 556,235

5 Claims. (Cl. 196—20)

This invention relates to the treatment of crude petroleum wax. More particularly, the present invention is concerned with an improved process for removing oil from a crude mixture of solid waxy hydrocarbons and effecting separation of the same into a low melting point wax and a high melting point wax.

In the usual refining of petroleum, the crude is subjected to distillation, separating it into a number of fractions of varying volatilities and viscosities. The fraction ordnarily referred to as "paraffin distillate," which, in general, is a fraction having a boiling range of about 340° F. to about 590° F., when distilled under an absolute pressure of 10 millimeters of mercury and which ordinarily is obtained from paraffinic base and mixed base crudes, is separated into a solid wax fraction and a liquid oil fraction. Such separation or dewaxing may be accomplished by diluting the paraffin distillate with an appropriate solvent which is miscible with the oil but immiscible with the wax, chilling the resulting mixture and filter pressing. Alternatively, the desired separation may be effected by various centrifugal processes, so-called cold settling processes and the like. The solid fraction so obtained is ordinarily referred to as slack wax and still contains a considerable quantity of oil of the order of 50 percent or more by weight.

This oil may be removed by any of a number of methods, such as by subjecting the slack wax to a "sweating" operation which consists essentially of fractionally melting and draining the oil and lower melting waxes from higher melting waxes. Another method employed is the solvent deoiling process in which a suitable solvent as, for example, a liquefied normally gaseous hydrocarbon, benzol, acetone, and the like is used. In such method, the solvent is usually added to the waxy charge and the resulting mixture is then chilled. The waxy constituents which separate out are ordinarily removed from the dewaxed oil by filtration. The resulting wax cake may be washed with a suitable solvent, such as naphtha, in order to further reduce the amount of oil in the wax. Still another deoiling method currently practiced is the emulsion process in which the wax charge is mixed with a non-viscous non-solvent while in the molten state, after which it is cooled to congeal the wax. The congealed wax is then separated from the oil in non-solvent emulsion by means of a basket type centrifuge lined with a filter material.

The crude hydrocarbon wax resulting from the above various processes will usually consist of oil, low melting point wax and high melting point wax. The proportions of these various constituents and the characteristics of the various oils and waxes contained in the crude wax will vary greatly depending on the original stock which has been dewaxed, the treatment which has been given this stock prior to the dewaxing process, and the particular dewaxing and deoiling process used. Usually, however, the oil content of the crude wax will be relatively small and generally within the approximate range of 2 to 10 percent by weight. In general, the waxes thus removed may be classified as petrolatum waxes which have relatively high melting points, generally within the approximate range of 145° F. to 170° F. and paraffin waxes consisting of commercially high melting point waxes, for instance, those melting at about 135° F. to about 150° F. and the relatively low melting point waxes, for instance, those melting below about 130° F.

It is a major object of the present invention to refine such crude wax and particularly to separate the same in an efficient manner, into its respective components.

The above and other objects which will be apparent to those skilled in the art are attained in accordance with the process of this invention, which comprises subjecting a charge of the above-described crude hydrocarbon wax to distillation under non-cracking conditions, removing as overhead a fraction of low melting point, low boiling point wax, removing as a separate fraction a higher boiling distillate containing high melting point paraffin wax, solvent deoiling the latter fraction to yield a high melting point paraffin wax and a filtrate, combining the filtrate from said deoiling with the aforementioned overhead fraction and solvent deoiling the resulting mixture to separate a low melting point paraffin wax therefrom.

It has been found, in accordance with the present invention, that the addition of low melting point, low boiling point overhead waxes to the filtrate resulting from solvent deoiling of the distillation heart-cut waxes enables an efficient separation of high melting and low melting waxes to be made. It has been discovered that the resulting mixture of overhead waxes and filtrate when subjected to solvent deoiling has an appreciably greater filtration rate than that secured upon solvent deoiling the filtrate waxes alone. Thus, the filtration rate of the above resulting mixture, following the process of this invention, is increased several-fold over the rate of filtration obtained at comparable wax oil content with the filtrate waxes alone.

The distillation step of the present process is carried out under conditions characteristic of sub-atmospheric distillation, i. e., vacuum distillation or distillation with steam or other suitable inert gas. The distillation is effected under conditions which avoid cracking of the crude wax charge. Thus, the distillation is desirably carried out below cracking temperatures, i. e., below about 650° F. and preferably between about 500° F. and about 600° F. When vacuum distillation is employed, it is preferred that the absolute pressure be in the order of 5 to 10 millimeters of mercury, and when steam distillation is employed, it is preferred that sufficient steam be used to provide from 1 to 2 volumes of condensed water per volume of distillate taken off.

The fractions are separated ordinarily on the basis of the average melting point of the waxes produced by deoiling the distillates. In accordance with the present invention, the crude wax charge is separated into two distillate fractions and a residual or bottoms fraction. The lower boiling distillate overhead fraction upon combination with the filtrate from solvent deoiling of the higher boiling distillate and subsequent deoiling of the mixture yields a low melting point wax, i. e., a wax having a melting point below about 130° F. and generally in the approximate range of 120° F. to 130° F. The higher boiling distillate fraction upon deoiling yields a high melting point wax, i. e ., one generally having a melting point in the approximate range of 135° F. to 150° F.

In carrying out the improved process of the present invention, the various deoiling operations of the products resulting from distillation of the crude wax are accomplished in the presence of solvents or diluents including, for example, ketones, such as acetone, methyl ethyl ketone, methyl propyl ketone, methyl isobutyl ketone, etc.; aromatic hydrocarbons, such as benzene and toluene; alcohols, such as ethyl alcohol, isopropyl alcohol, normal propyl alcohol, and the like; petroleum naphthas; halogenated hydrocarbons, such as ethylene dichloride and trichloroethylene; esters, such as ethyl acetate; ethers, such as diethyl ether and isopropyl ether; liquefied normally gaseous hydrocarbons, such as ethane, ethylene, propane, propylene, butane, isobutane, etc.; other normally gaseous diluents, such as methyl ether, methyl chloride, and dichloro difluoromethane, or mixtures thereof. The normally gaseous diluents serve to dilute and also to chill the mixture when the diluent is evacuated under reduced pressure. Ordinarily, mixtures of solvents or diluents such as toluene and methyl ethyl ketone are employed. It will be understood that the solvent employed is a preferential solvent for and miscible with the oil while being immiscible with the wax.

The solvent deoiling steps can be carried out by various known methods wherein the primary object of the step is to obtain a substantially completely oil-free wax. Preferably, the wax is mixed with at least a substantial portion of the solvent or diluent, such as at least 1 to 4 volumes of solvent per volume of wax. Then the mixture is preferably heated to about 20° F. to 50° F. above the average melting point of the wax material. During the subsequent chilling of the solvent-wax-oil mixture, additional solvent, such as 1 to 10 or more volumes per volume of wax charge, can be added as desired. After the mixture has been cooled to the proper wax deoiling temperature, i. e., about 0° F. to 60° F., the oil-free wax is separated in a suitable manner, such as by means of a continuous filter. The wax product contains less than 1 percent, preferably less than 0.5 percent oil.

Distillation of the low melt waxes into an overhead fraction in accordance with the present process minimizes processing these waxes through the high melt wax cycle. Generally, an overhead fraction of from 1 to 50 percent by volume, and preferably from about 10 to about 30 percent by volume, will be utilized in processing the crude hydrocarbon wax. Distillation may be carried out so that substantially no residue is obtained or residual wax, if any, remaining after the distillation may be deoiled either separately or in mixture with the distillation overhead and the filtrate from the high melt wax processing. Deoiling of the mixture is preferred since plant operations are thereby simplified by reducing the number of products handled.

The method of the invention is illustrated in simplified diagrammatic form in the attached drawings wherein:

Figure 1 shows one embodiment of the process of the invention.

Figure 2 shows a second and generally preferred embodiment of the process of the invention.

Referring more particularly to Figure 1, the charge of crude hydrocarbon wax is introduced into distillation column 10 through conduit 11. A low boiling, low melting paraffin wax passes overhead through conduit 12. A high melting paraffin wax distillate passes through conduit 13 to solvent deoiling unit 14. High melting point wax is withdrawn via conduit 15 and the filtrate resulting from such deoiling is withdrawn through conduit 16. The latter is combined with the overhead distillate flowing through conduit 12 and the resulting mixture is conduced to solvent deoiling unit 17 wherein low melting point wax is separated and withdrawn through outlet 18. The oil removed in such unit is withdrawn through outlet 19. Wax residue remaining in column 10 after distillation is withdrawn through conduit 20 and conducted to solvent deoiling unit 21 from which deoiled residual wax is withdrawn through outlet 22 and the separated oil is removed through outlet 23.

Turning now to the procedure shown in Figure 2, the charge of crude hydrocarbon wax is introduced into distillation column 30 through conduit 31. A low boiling, low melting paraffin wax passes overhead through conduit 32. A high melting paraffin wax distillate passes through conduit 33 to solvent deoiling unit 34. High melting point wax is withdrawn from such unit through conduit 35 and the filtrate resulting from such deoiling is withdrawn through conduit 36. The latter is combined with the overhead distillate flowing through 32 and residual wax remaining from the distillation flowing through conduit 37. The resulting mixture is conducted to solvent deoiling unit 38 wherein low melting point wax is separated and withdrawn through outlet 39 and separated oil is removed through outlet 40.

Typical results obtained in accordance with the present process are as follows:

A crude hydrocarbon wax having a melting point (ASTM) of 130° F. and an oil content of 3.9 percent by weight was fractionated at a pressure of 10 mm. of mercury to obtain 0–87, 13–87, 43.5–87, and 87–100% volume cuts. Physical characteristics of the crude wax fractions so obtained are shown in the following Table I:

*Table I*

| | Distillation fractions | | | | |
|---|---|---|---|---|---|
| Position in charge | 0–87 | 13–87 | 26–87 | 43.5–87 | 87–100 |
| Yield, percent vol. charge | 87 | 74 | 61 | 43.5 | 13 |
| Properties of fractions: | | | | | |
| Gravity, ° API | 42.3 | 42.8 | 42.5 | 41.7 | 38.0 |
| Melting point, ° F., ASTM | 130 | 131 | 133 | 134 | 147 |
| Oil content, percent weight | 3.7 | 3.0 | 2.9 | 2.7 | 7.1 |
| Distillation at 10 mm.— | | | | | |
| I. B. P. ° F | 388 | 428 | 432 | 446 | 486 |
| 10% | 452 | 472 | 486 | 488 | 564 |
| 20% | 468 | 486 | 506 | 510 | 572 |
| 30% | 488 | 494 | 510 | 518 | 584 |
| 40% | 498 | 504 | 516 | 522 | 590 |
| 50% | 510 | 512 | 524 | 526 | 604 |
| 60% | 518 | 522 | 530 | 528 | 612 |
| 70% | 526 | 530 | 538 | 532 | 620 |
| 80% | 538 | 538 | 546 | 540 | 625 |
| 90% | 552 | 550 | 554 | 556 | |
| E. P. ° F | 594 | 598 | 596 | 594 | |

These distillation fractions were deoiled at temperatures ranging between 20° F. and 60° F., employing a solvent of methyl ethyl ketone (60% volume) and toluene (40% volume), utilizing a total solvent to oil ratio of 15 to 1, and removing the resulting deoiled wax on a rotary filter. Yields, melting points, and oil contents of the deoiled waxes are set forth in Table II below:

*Table II*

| Distillation fraction in charge, percent vol. | Deoiling temp., ° F. | Wax yield, percent | | Wax properties | |
|---|---|---|---|---|---|
| | | Charge | Overall [1] | Melting point, ° F., ASTM | Oil content, weight, percent |
| 0–87 | 20 | 83 | 72 | 133 | 0.1 |
| | 40 | 72 | 63 | 136 | 0.1 |
| | 50 | 63 | 55 | 138 | 0.1 |
| | 60 | 48 | 42 | 141 | 0.1 |
| 13–87 | 20 | 83 | 61 | 135 | 0.1 |
| | 40 | 73 | 54 | 138 | 0.1 |
| | 60 | 49 | 36 | 142 | 0.1 |
| 26–87 | 20 | 83 | 51 | 137 | 0.1 |
| | 30 | 78 | 48 | 138 | 0.1 |
| | 40 | 74 | 45 | 139 | 0.1 |
| | 60 | 55 | 34 | 144 | 0.1 |
| 43.5–87 | 20 | 83 | 36 | 139 | 0.1 |
| | 40 | 75 | 33 | 141 | 0.1 |
| | 60 | 57 | 25 | 145 | 0.1 |
| 87–100 | 20 | 82 | 11 | 150 | 0.1 |
| | 40 | 72 | 9 | 153 | 0.1 |
| | 60 | 60 | 8 | 158 | 0.1 |

[1] Based on crude wax.

Low melting point waxes are available in the filtrate from the high melt wax preparation and from distillation overheads and bottoms. Blends of these components were prepared in proportion to their yields from the original crude wax. The filtrate resulting from preparation of the high melt wax and blends of this material with the distillation overhead and with the distillation overhead and bottoms were deoiled at temperatures varying from 0° F. to 40° F. with a solvent of 40 percent volume toluene and 60 percent volume methyl ethyl ketone. Yields and melting points of the waxes obtained are presented in Table III below:

Table III

| Dist. fraction position in chg., percent vol. | H.M. wax deoiling temp., °F. | Filtrate yield from H.M. wax | | L.M. wax deoiling temp., °F. | High melt wax filtrate | | | Filtrate+overhead | | | Filtrate+overhead+bottoms | | |
|---|---|---|---|---|---|---|---|---|---|---|---|---|---|
| | | Percent of charge [1] | Percent of crude [2] | | M.P., °F., ASTM | Deoiling yield, percent vol. | Overall yield [2], percent vol. | M.P., °F., ASTM | Deoiling yield, percent vol. | Overall yield [2], percent vol. | M.P., °F., ASTM | Deoiling yield, percent vol. | Overall yield [2], percent vol. |
| 0-87 | 50 | 37 | 32 | 0 | 110 | 90 | 29 | | | | 120 | 91 | 41 |
| | | | | 20 | 114 | 77 | 25 | | | | 124 | 80 | 36 |
| | | | | 40 | 117 | 63 | 20 | | | | 129 | 68 | 31 |
| 13-87 | 40 | 27 | 20 | 0 | 110 | 80 | 16 | 114 | 83 | 27 | 124 | 86 | 40 |
| | | | | 20 | 112 | 66 | 13 | 116 | 69 | 23 | 127 | 74 | 34 |
| | | | | 40 | 114 | 53 | 11 | 118 | 55 | 18 | 132 | 61 | 28 |
| 26-87 | 30 | 22 | 13 | 0 | 111 | 75 | 10 | 119 | 80 | 32 | 125 | 81 | 42 |
| | | | | 20 | 113 | 52 | 7 | 120 | 60 | 24 | 127 | 64 | 34 |
| | | | | 40 | 115 | 29 | 4 | 122 | 40 | 16 | 132 | 48 | 25 |
| 43.5-87 | 20 | 17 | 7 | 0 | 109 | 67 | 5 | 125 | 82 | 42 | 129 | 84 | 54 |
| | | | | 20 | 111 | 44 | 3 | 128 | 69 | 35 | 132 | 72 | 46 |
| | | | | 40 | 113 | 22 | 2 | 132 | 53 | 27 | 135 | 58 | 37 |

[1] Based on distillation fraction to initial deoiling.
[2] Based on full range crude wax.

It will be seen, as an example, from the above table that wax with a melting point of 119° F. is obtained when the blend of filtrate and 26 percent volume overhead is deoiled at 0° F. Addition of the bottoms 87–100 percent fraction to this blend and deoiling of the mixture results in a wax having a melting point of 125° F. Increasing the percentage of overhead wax results in a product of higher melting point.

The marked improvement in filtration rate obtained by addition of distillation overhead wax to the filtrate from solvent deoiling high melt wax is shown by the following comparative examples in which a crude hydrocarbon wax charge of above-described characteristics was treated under previously described conditions. The wax product in each instance had an identical oil content, i. e., 0.5 percent by weight.

| Ex. | Wax blend | Filtration rate, lbs. wax/hr./sq. ft. |
|---|---|---|
| 1 | Filtrate from deoiling of 13–87% distillation fraction. | 10 |
| | Filtrate from deoiling of 13–87% distillation fraction plus 0–13% overhead cut from crude wax charge. | 15 |
| 2 | Filtrate from deoiling of 26–87% distillation fraction. | 6 |
| | Filtrate from deoiling of 26–87% distillation fraction plus 0–26% overhead cut from crude wax charge. | 30 |
| 3 | Filtrate from deoiling of 43.5–87% distillation fraction. | 5 |
| | Filtrate from deoiling of 43.5–87% distillation fraction plus 0–43.5% overhead cut from crude wax charge. | 30 |

It is to be understood that the above description is merely illustrative of preferred embodiments of the invention, of which many variations may be made within the scope of the following claims by those skilled in the art without departing from the spirit thereof.

We claim:

1. A method for separating a crude hydrocarbon wax into a high melting paraffin wax and a low melting paraffin wax, which comprises subjecting the crude wax to distillation under non-cracking conditions, removing as overhead, a distillate containing low melting point, low boiling wax, removing as a separate higher boiling distillate, a fraction containing high melting point wax, deoiling the latter fraction by admixing with a solvent miscible with oil but substantially immiscible with wax, chilling the resulting mixture and filtering to yield a high melting point paraffin wax and a filtrate, admixing said filtrate with the aforementioned overhead and solvent deoiling the resulting mixture to separate a low melting point paraffin wax therefrom.

2. In the treatment of crude hydrocarbon wax wherein the wax is distilled into at least two fractions, one fraction containing low melting point wax and a second fraction containing high melting point wax and each of said fractions is subjected to solvent deoiling to yield a wax and a filtrate, the improvement which comprises admixing the filtrate from deoiling of the high melting point wax with the fraction containing low melting point wax prior to solvent deoiling of the latter.

3. A method for resolving a crude hydrocarbon wax consisting essentially of oil, high melting wax and low melting wax into its components, which comprises distilling the crude wax under non-cracking conditions into two distillate fractions and a bottoms fraction, removing the lower boiling of said distillate fractions as overhead, removing the higher boiling of said distillate fractions, subjecting said higher boiling distillate to solvent deoiling to yield a high melting point wax and a filtrate, admixing said filtrate with said overhead and said bottoms fraction and solvent deoiling the resulting mixture to separate a low melting point wax therefrom.

4. In the treatment of crude hydrocarbon wax wherein the wax is distilled into various distillate fractions and a bottoms fraction, one of said distillate fractions containing low melting wax and another of said distillate fractions containing high melting wax, the improvement which comprises solvent deoiling the latter fraction to yield a high melting point wax and a filtrate, admixing said filtrate with said distillate fraction containing low melting wax and with said bottoms fraction and solvent deoiling the resulting mixture to separate a low melting point wax therefrom.

5. In the process of distilling a crude hydrocarbon wax under non-cracking conditions wherein overhead distillate of low melting wax components is removed and a separate distillate of high melting wax components is removed and subjected to solvent deoiling, yielding a high melting point wax and a filtrate, the improvement which comprises increasing the rate of filtration of said filtrate upon subsequent solvent deoiling thereof by admixing therewith prior to said deoiling the aforesaid overhead distillate.

References Cited in the file of this patent

UNITED STATES PATENTS

| | | |
|---|---|---|
| 1,927,057 | Anderson | Sept. 19, 1933 |
| 2,467,959 | Bowman et al. | Apr. 19, 1949 |
| 2,670,318 | Halamka et al. | Feb. 23, 1954 |
| 2,734,365 | Ferris et al. | Feb. 14, 1956 |